United States Patent
Gentry et al.

(10) Patent No.: US 11,716,993 B2
(45) Date of Patent: Aug. 8, 2023

(54) FERAL HOG TOXICANT

(71) Applicant: Board of Supervisors of Louisiana State University and Agricultural and Mechanical College, Baton Rouge, LA (US)

(72) Inventors: Glen Gentry, Clinton, LA (US); John Pojman, Baton Rouge, LA (US); Baylen Thompson, Spanish Fort, AL (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 17/000,581

(22) Filed: Aug. 24, 2020

(65) Prior Publication Data

US 2021/0068398 A1    Mar. 11, 2021

Related U.S. Application Data

(60) Provisional application No. 62/896,779, filed on Sep. 6, 2019.

(51) Int. Cl.
*A01N 59/00* (2006.01)

(52) U.S. Cl.
CPC .................................. *A01N 59/00* (2013.01)

(58) Field of Classification Search
CPC ..................................................... A01N 59/00
See application file for complete search history.

(56) References Cited

U.S. PATENT DOCUMENTS 8,795,649 B2    8/2014  Staples ........................ 428/84

FOREIGN PATENT DOCUMENTS

| DE | 102006051088 A1 | * | 6/2008 | ........... A23L 1/2753 |
| WO | WO-2008104028 A1 | * | 9/2008 | ........... A01N 25/002 |
| WO | WO2010151150 A2 | | 12/2010 | |
| WO | WO-2018039739 A1 | * | 3/2018 | ........... A01M 25/00 |

OTHER PUBLICATIONS

Snow et al., "Potential Secondary Poisoning Risks to Non-Targets From a Sodium Nitrite Toxic Bait for Invasive Wild Pigs," Pest Manag Sci. DOI 10.1002/ps. 4692 (2017).

L. Shapiro et al., "Efficacy of Encapsulated Sodium Nitrite as a New Tool for Feral Pig Management," Journal of Pest Science. 89.10. 1007/s10340-015-0706-7 (2015).

B. Thompson and Pojman Research Team, "Encapsulation of Sodium Nitrite," slides of presentation given at LSU Idlewild Research Center (Sep. 15, 2018).

G. Gentry, "Development of Control Options for Feral Swine in Soybean Fields," presentation made to Louisiana Soybean and Grain Research and Promotion Board, Baton Rouge, LA, Nov. 21, 2019.

G. Gentry, "Development of an Encapsulation Protocol for Sodium Nitrite for Control of Feral Swine in Rice," presentation made to Louisiana Rice Research Board, Crowley, LA, Oct. 7, 2019.

G. Gentry, "Management and Control of Feral Hogs," presentation made to Southern Section of Weed Science Society, Biloxi MS, Jan. 27, 2020.

G. Gentry, "Feral Swine Toxicant Update," presentation made to Bob R Jones Wildlife Research Institute Board Meeting, Clinton, LA, Feb. 20, 2020.

* cited by examiner

*Primary Examiner* — Snigdha Maewall
(74) *Attorney, Agent, or Firm* — John H. Runnels

(57) ABSTRACT

A composition and method for killing feral hogs: a bait that is attractive to hogs is mixed with a lethal amount of sodium nitrite, along with sufficient base to inhibit decomposition of the sodium nitrite. At sufficiently high pH, encapsulation of the sodium nitrite is not required to inhibit decomposition. In the absence of substantial decomposition, the sodium nitrite itself is not aversive to the pigs, and may even enhance acceptance of the baits by the pigs. Optionally, an anti-emetic compound is added to the mixture to reduce the likelihood the bait will be vomited. Optionally, an additional toxicant such as luteolin is added to the mixture.

7 Claims, No Drawings

FERAL HOG TOXICANT

The benefit of the Sep. 6, 2019 filing date of U.S. provisional patent application Ser. No. 62/896,779 is claimed under 35 U.S.C. § 119(e). The complete disclosure of the priority application is hereby incorporated by reference in its entirety.

TECHNICAL FIELD

This invention pertains to compositions for killing feral hogs, methods for making such compositions, and methods of using such compositions.

BACKGROUND ART

Wild pigs, or feral hogs (*Sus scrofa*) damage crops across the United States, with annual losses estimated at $1.5 billion. Wild pigs also pose a significant risk to human health. Data suggest that they carry zoonotic diseases, potentially affecting humans and other mammals, with some pathogens that can be transferred to surface waters. Zoonotic diseases carried by wild pigs include anthrax, bovine herpes virus, bovine tuberculosis, brucellosis, campylobacteriosis, colibacillosis (*E. coli*), various coronaviral infections, cysticercosis, echinococcosis, encephalomyocarditis, erysipelas, foot and mouth disease, helicobacter, hepatitis E, influenza A, influenza D, Japanese encephalitis, leptospirosis, listeriosis, louping-III virus, menangle virus, papillomavirus, parainfluenza virus, plague, pseudorabies, Q fever, rabies, ringworm, salmonellosis, sarcocystosis, scabies, shigellosis, staphylococcosis, stephanuriasis, streptococcosis, toxoplasmosis, trichinellosis, tularemia, vesicular stomatitis, West Nile virus, and yersiniosis. However, pigs do not appear to be carriers of SARS-CoV-2. Wild pigs have also been documented to attack humans, often unprovoked, although such attacks are relatively uncommon.

Current methods to control feral swine include trapping, hunting, shooting, and snaring, depending on local laws. However, the population of this invasive species continues to increase. Wild pigs reproduce so rapidly that shooting and trapping are ineffective means of population control. Other previous efforts to control feral swine have had poor results.

Feral swine reproduce so rapidly that it is estimated that about 70% of the current population would need to be removed each year, just to hold the population constant. Such a high level of control is difficult to achieve by hunting and trapping alone.

Sodium nitrite in high doses is lethal to pigs, but it has previously been difficult to use as a toxicant for hogs. Sodium nitrite imparts a bitter taste to baits, and the bitterness makes pigs avoid the baits. One approach to this problem has been to microencapsulate the sodium nitrite, to minimize its effect on a bait's taste. While microencapsulation can be effective, microencapsulated formulations are relatively expensive, and the thin encapsulation layers can degrade under humidity and temperature conditions often encountered in the field.

To the inventors' knowledge, there have been no previous reports of any effective, sodium nitrite-based hog toxicant, that has successfully used an approach other than encapsulation to mitigate the bitter taste associated with nitrite. Although encapsulation can be effective, it adds to the expense.

If an inexpensive solution were available for the problem of bitter taste, sodium nitrite would be a preferred toxicant to use against hogs. Although sodium nitrite is not species-specific for hogs, hogs are especially sensitive to sodium nitrite, with a much lower $LD_{90}$ than that of many other wildlife species. Also, the effects of sodium nitrite are not cumulative, meaning there should ordinarily be no long-term adverse effects if a non-target species incidentally eats a small amount of a sodium nitrite-containing bait intended for pigs—e.g., crumbs left on the ground.

Furthermore, over time sodium nitrite will break down in most environments (even when administered in accordance with the novel formulation described herein), so it should not linger in the environment as a long-term toxic residue.

L. Shapiro et al. (2015). Efficacy of encapsulated sodium nitrite as a new tool for feral pig management. Journal of Pest Science. 89. 10.1007/s10340-015-0706-7 disclose the use of encapsulated sodium nitrite in a palatable paste matrix bait to provide a lethal dose to feral pigs.

Snow et al. (2017). Potential secondary poisoning risks to non-targets from a sodium nitrite toxic bait for invasive wild pigs. Pest Manag Sci. DOI 10.1002/ps.4692 disclose the use of microencapsulated sodium nitrite formulations as the active ingredient in a bait matrix for controlling feral hogs; and the secondary effects of such baits on non-target species. The encapsulated formulations were described generally as one of the following: a water-soluble protein coating, a double coating of the water-soluble protein, a soft wax coating insoluble in water, or an acidic resistant resin designed for enteric release of pharmaceuticals.

U.S. Pat. No. 8,795,649 discloses the use of baits with nitrite salts such as sodium nitrite to control feral animals such as feral pigs.

WO2010151150A2 reported that adding omeprazole (a proton pump inhibitor) to a microencapsulated sodium nitrite-containing bait had a slight, but not significant, effect upon toxicity and subsequent time to death for pigs.

B. Thompson and Pojman Research Team, "Encapsulation of Sodium Nitrite," slides of presentation given at LSU Idlewild Research Center (Sep. 15, 2018) gives some preliminary results from work carried out by the inventors and their colleagues concerning the encapsulation of sodium nitrite as a potential hog toxicant; and possible alternatives to encapsulation such as treatment with baking soda or essence of rotting fish.

See also the following presentations of work carried out by the inventors and their colleagues: G. Gentry, "Development of Control Options for Feral Swine in Soybean Fields," presentation made to Louisiana Soybean and Grain Research and Promotion Board, Baton Rouge, La., Nov. 21, 2019; G. Gentry, "Development of an Encapsulation Protocol for Sodium Nitrite for Control of Feral Swine in Rice," presentation made to Louisiana Rice Research Board, Crowley, La., Oct. 7, 2019; G. Gentry, "Management and Control of Feral Hogs," presentation made to Southern Section of Weed Science Society, Biloxi Miss., Jan. 27, 2020; and G. Gentry, "Feral Swine Toxicant Update," presentation made to Bob R Jones Wildlife Research Institute Board Meeting, Clinton, La., Feb. 20, 2020.

There is an unfilled need for improved compositions and methods to control feral swine populations.

SUMMARY OF THE INVENTION

We have discovered an improved composition and method for killing feral hogs. Briefly, a bait that is attractive to pigs is mixed with a lethal concentration of sodium nitrite, along with sufficient base (alkali) to inhibit decomposition of sodium nitrite. Encapsulation of the sodium nitrite is not required if the pH is sufficiently high to inhibit decomposition. When decomposition is minimized, we have found that, contrary to conventional wisdom, sodium nitrite itself is actually not aversive to pigs. Rather, we found that it is only the decomposition products of sodium nitrite that are aversive to pigs, decomposition products that can be avoided by avoiding acidic conditions. By using a higher pH, such decomposition is minimized. Optionally, an anti-emetic compound is added to the mixture to reduce the likelihood that the bait will be vomited. Optionally, an additional toxicant such as luteolin is added to the mixture.

The present invention provides a toxicant that can effectively target wild pigs, with low impact on non-target species. Sodium nitrite is delivered in a form that resists the rigors of the environment, in a bait station or otherwise, without imparting a bitter flavor that could make the bait repellent to hogs. After the bait is consumed, the formulation releases a lethal dose of sodium nitrite in the pigs' digestive tract. The invention will help reduce the wild pig population, will help reduce damage to crops caused by pigs, will help reduce environmental destruction by pigs, and will help reduce the incidence of zoonotic diseases spread by pigs.

$LD_{90}$ for sodium nitrite in adult hogs is about 189 mg/kg. Our earlier approach to address the problem of sodium nitrite bitterness had been to seek improved encapsulation formulations for sodium nitrite. While encapsulation methods can work, in the course of this work we discovered, quite unexpectedly, that encapsulation was not needed. By controlling the pH of the formulation, encapsulation becomes unnecessary.

One bait formulation used in prototype trials contained dehydrated fish. The sodium nitrite was added to a potato dextrose agar mixture with ground fish. Hogs ate this bait and were poisoned by the nitrite. Trials will also be conducted using alternative bait ingredients that are also appealing to pigs. These baits will be compared with whole-shelled corn, which serves as the control, a standard for all comparisons of acceptance and consumption by pigs.

Vacuum-packing the baits until they are used is optional, and is preferred to enhance shelf life. Refrigeration or freezing is another optional step that can also enhance shelf life.

The lethal dose should be delivered to the pigs in a very short period of time, preferably as a bolus. If the toxicant delivery is spread out—even over a time as short as one hour—its efficacy can be greatly reduced or lost entirely. The effects of sodium nitrite are not cumulative over time; the toxicant should be delivered to each pig essentially all at once or over a very short period of time.

Unexpectedly, we discovered that raising the pH inhibits decomposition of the nitrite, without the need to encapsulate the nitrite. We found that by raising the pH, it became unnecessary to encapsulate nitrite to inhibit decomposition in a bait used as a hog toxicant.

Contrary to prevailing wisdom, we have discovered how to incorporate sodium nitrite into effective hog baits without the need for encapsulation, and without imparting a bitter taste that repels hogs from a bait, by maintaining at least a neutral pH, or preferably a basic pH. Sodium nitrite itself is actually not bitter. $NaNO_2$ only acquires a bitter taste as it decomposes in response to the environment. When sodium nitrite is not exposed to moisture or to acidic pH levels, it does not itself have a bitter taste, and indeed its taste is nearly identical to that of sodium chloride, common table salt.

Encapsulation may optionally also be employed, along with raising the pH, to further enhance the effective lifetime of baits in the field—but our discovery makes encapsulation unnecessary. The effective lifetime of baits in the field can be enhanced by both encapsulating the sodium nitrite and raising the pH of the sodium nitrite or of the bait as a whole, but in many circumstances it will not be advantageous or economical to do so.

The pH of the bait inhibits the decomposition of sodium nitrite, such that when the bait is placed outdoors in the field or in a bait station under ambient conditions, any decomposition of the sodium nitrite is sufficiently slow that the bait does not become aversive to hogs for at least seven days, and will readily be eaten by feral hogs for at least seven days. The effective lifetime of baits in the field will of course vary, depending on the prevailing ambient conditions. The composition should inhibit decomposition (to a point where it becomes aversive to hogs) for at least seven days when the ambient conditions include daytime temperatures of 45° F. or greater, 50° F. or greater, 55° F. or greater, 60° F. or greater, 65° F. or greater, 70° F. or greater, 75° F. or greater, 80° F. or greater, 85° F. or greater, 90° F. or greater, or 95° F. or greater; and when the ambient conditions include a daytime relative humidity that at least at times is 40% or greater, 45% or greater, 50% or greater, 55% or greater, 60% or greater, 65% or greater, 70% or greater, 75% or greater, 80% or greater, 85% or greater, 90% or greater, or 95% or greater.

We have observed that deer tend not to eat baits in accordance with the present composition. Bears however will eat the baits, but proper design and use of a bait station can help minimize off-target consumption by bears. Other non-target species that have not yet been tested include raccoons, opossums, birds, dogs, and cats.

The pH of the bait should be 7 or higher to inhibit decomposition of sodium nitrite into bitter products. It is preferred that the pH should be higher than 7. It is particularly preferred to incorporate an alkaline material into the bait, such as calcium carbonate or sodium bicarbonate, that can neutralize stomach acid and inhibit vomiting. The pH can be 7 or greater, 7.5 or greater, 8 or greater, 8.5 or greater, 9 or greater, 9.5 or greater, 10 or greater, 10.5 or greater, 11 or greater, 11.5 or greater, 12 or greater, or 12.5 or greater. Preferably, the pH of the bait is from 8 to 11. Although a pH of 7 is marginally acceptable, a slightly higher pH, e.g., 8 or higher, is preferred to counteract acidity from carbon dioxide in the air. A pH of 8 to 11, or 8 to 12, can also help inhibit vomiting of the baits.

Egg whites can be alkaline. In an alternative embodiment, egg white may be incorporated into the bait, in lieu of or in addition to some or all of the inorganic alkaline salt. When chicken eggs are first laid, the pH of the albumen (egg white) is nearly neutral, but over time the pH of the albumen can rise to around 9.3-9.5.

In accordance with standard food science procedures, the pH of a bait material may be determined by grinding it into a paste, and inserting the probe of an ordinary pH meter into the paste to directly measure the pH in the otherwise usual manner. If the bait is too dry to give reliable readings in this way, then the ground bait may be moistened with a sufficient quantity of deionized water to enable the pH meter and probe to take reliable measurements within the resulting paste.

Potato dextrose agar (PDA) is a weak acid, pH ~5, as are other common materials that might typically be used in a bait. On its own, sodium nitrite is not a strong enough base to overcome the acidity of a PDA matrix, and additional basic materials should be incorporated into the bait to raise the bait's pH.

The pH of the bait matrix is controlled so that, until the bait is consumed, the sodium nitrite is only in contact with neutral or (preferably) alkaline mixtures. At non-acidic pH, no bitter flavor develops. Indeed, the resulting salty flavor results in a bait that actually seems to be preferred by feral hogs over control baits lacking sodium nitrite. Ironically, at higher pH the lethal sodium nitrite can actually increase hogs' consumption of the bait as compared to an otherwise identical bait lacking sodium nitrite.

Optionally, monosodium glutamate (MSG) can also be incorporated into the bait, to further increase its acceptance by hogs. MSG enhances the "umami" flavor. MSG can attenuate the sweetness of components such as potato dextrose agar, and it may somewhat attenuate the saltiness of the nitrite itself, in addition to imparting a meaty flavor. Alternatively, monopotassium glutamate (MPG) can provide an umami flavor without increasing sodium levels. Because MSG adds sodium while MPG does not, it is possible that MPG could assist in avoiding the upper limit of saltiness that hogs are willing to eat, although this possibility had not yet been tested as of the filing date of this patent application. Either of these additives (MSG or MPG) can help increase the levels of sodium nitrite that can be loaded into baits, while retaining a flavor that hogs find acceptable. Optionally, other nitrite salts may be used in lieu of sodium nitrite, e.g., potassium nitrite, calcium nitrite, magnesium nitrite, lithium nitrite, or ammonium nitrite.

Another difficulty of using sodium nitrite as a toxicant is that feral hogs can sometimes vomit the baits. The acidic decomposition of sodium nitrite in gastric juices can lead to the release of noxious, gaseous by-products that can induce vomiting. This tendency can be counteracted by incorporating into the bait antiemetic compounds, antacid compounds, or both. Antacids include such compounds as sodium carbonate, sodium bicarbonate, calcium carbonate, magnesium hydroxide, magnesium carbonate, potassium carbonate, amines (e.g. from fish), and potassium bicarbonate. Antacids such as sodium carbonate also help maintain a higher pH level before the bait is consumed. Then after consumption the antacids can help neutralize gastric acid, both inhibiting the breakdown of sodium nitrite in vivo, and also helping to reduce vomiting. Our preliminary results have shown that sodium carbonate is effective in reducing vomiting after toxicant baits are consumed. Anti-emetics can also be employed, for example taste-free ginger extracts containing gingerols. Gingerols directly inhibit vomiting via pharmacological action on serotonin type-3 receptors in the digestive system. Gingerols have the same mechanism of action as drugs such as Zofran (ondansetron), which are prescribed in humans for the treatment of severe, chemotherapy-induced nausea. Other anti-emetics known in the art may also be used.

An optional embodiment enhances the effective of sodium nitrite by incorporating the flavonoid luteolin into a bait. Luteolin is found in botanical sources including celery, broccoli, green pepper, parsley, thyme, dandelion, perilla, chamomile, carrots, olive oil, peppermint, rosemary, oranges and other citrus, oregano, and certain palm seeds. The mechanism of sodium nitrite toxicity is to oxidize hemoglobin in the blood to methemoglobin, converting the iron atom from the ferrous form to the ferric form. Methemoglobin has a poor ability to transport oxygen to cells. Methemoglobin is naturally present in mammalian blood at 1-2% of total hemoglobin, a level that is ordinarily tempered by the enzyme methemoglobin reductase (MR). One factor that makes sodium nitrite well-suited for killing hogs is that hogs naturally possess lower levels of MR than do humans and many other mammals. Because hogs have a poor ability to detoxify methemoglobin build-up, they are inherently more prone to developing high concentrations of methemoglobin upon exposure to sodium nitrite, which can quickly lead to death. In an optional embodiment, this physiology is further exploited by incorporating MR inhibitors into the bait, thus facilitating control of feral hogs while releasing less total nitrite into the environment. Luteolin is a highly-potent, commercially-available, naturally-occurring, tasteless MR inhibitor. Adding small amounts of luteolin to a nitrite-containing bait will reduce a hog's ability to detoxify methemoglobin. Thus the baits can have enhanced potency with less total toxicant. The water solubility of luteolin increases as the pH increases, due to ionization of phenolic hydroxyl groups. Luteolin is poorly soluble at neutral or acidic pH. The higher pH of the baits used in this invention is compatible with luteolin.

As of the filing date of this patent application, we do not yet have data on the incorporation of luteolin into baits. Following are some preliminary guidelines until experimental data become available; the guideline amounts may readily be adjusted based on experimental measurements of effectiveness: The $IC_{50}$ for luteolin is about 0.11 micromolar. Assuming there are about 65 mL blood per kilogram body mass in the pig, the amount of luteolin needed for 50% inhibition of the MR enzyme should be about ~2 micrograms per kilogram body mass. Assuming an conservative bioavailability as low as 0.1%, a guideline amount to administer is 2 milligram luteolin per kilogram of pig body mass. For a 150 kg pig, roughly 300 milligrams of luteolin should inhibit MR by 50%. We expect 300-1000 mg luteolin per bait should be an effective dose. Luteolin is inexpensive and tasteless, and it should not affect acceptability of the bait to pigs.

Other MR inhibitors could also be used, in addition to or in lieu of luteolin. For example, some anthoxanthins or their bioconjugates (e.g., luteolin-7-O-glucoside) act as MR inhibitors, and these compounds may be incorporated into the bait.

It is preferred to take simple steps otherwise known in the art to enhance the shelf life of baits generally—for example, one or more of vacuum packing, refrigeration, or freezing.

Hog behavior is such that hogs may naturally tend to hoard baits, tending to keep them from one another. One possible method of administration that can both help counteract this tendency, and also help reduce potential exposure of non-target species, is to bury the baits in the ground, spaced at least 4 to 5 feet apart. The pigs' natural rooting behavior will tend to lead them to the baits; the spacing will tend to reduce hoarding; and burying the baits will tend to limit exposure to non-target species.

MODES FOR CARRYING OUT THE INVENTION

Example 1: Feral Hog Toxicant With Increased pH

To a 2 L beaker was added 1500 mL deionized water. The beaker with water was heated to boiling, and 117 g potato dextrose agar (PDA) was slowly added under 2000 rpm mechanical stirring. Once the mixture was homogeneous, the PDA solution was cooked in a pressure cooker for 15 minutes on the pressure cooker's "brown rice" setting (15 psi and 240° F.). After cooking, the mixture was transferred back into the 2 L beaker and stirred at 1500 rpm. During the stirring, 45 grams of ground, dehydrated fish was added, along with 10 grams of the base sodium carbonate. Sodium nitrite (150 grams) was added under stirring once the fish/PDA mixture had reached a temperature of 55° C. After mixing was complete, a garden syringe was used to quickly transfer the completed bait matrix into spherical, 50 mL molds. The filled molds were placed in a freezer, and the baits were packaged after they had frozen.

Examples 2 and 3: Feral Hog Toxicant With Encapsulated Sodium Nitrite

Ethocel™ Encapsulation

A pan coating device equipped with a nitrogen drying line was charged with 1 kg sodium nitrite. A solvent containing 80:20 (mass ratio) acetone:ethanol was used to prepare a 10 weight-percent solution of DOW Ethocel™ Standard 10 (ethylcellulose polymer). To the solvent solution was added 1% glycerol by total solution mass. All components were stirred until homogeneous, and the mixture was then placed into a handheld spray bottle. The Ethocel™ coating solution was applied to the sodium nitrite as it tumbled in a coating drum. Nitrogen gas was piped into the drum to facilitate drying. Successive coats were applied until the desired coating thickness had been reached. After the last coat was applied, the encapsulated sodium nitrite was tumbled until dry and then stored until use.

Shellac Encapsulation

A pan coating device equipped with a nitrogen drying line was charged with 1 kg sodium nitrite. Zinsser Bullseye™ aerosol shellac was applied to the sodium nitrite as the sodium nitrite tumbled in the coating drum. Nitrogen gas was piped into the drum to facilitate drying. Successive coats were applied until the desired coating thickness was reached. After the last coat had been applied, the encapsulated sodium nitrite was tumbled until dry and then stored until use.

These encapsulated sodium nitrite preparations are also toxic against hogs (data not shown).

Examples 4 and 5

Prototype Trials Using Un-Encapsulated, High-pH Sodium Nitrite Baits on Feral Swine Two sets of trials were conducted on wild-captured feral swine at the Bob R. Jones Idlewild Research Station (Clinton, La.) from December 2018 through September 2019. Pigs were offered two-inch spheres generally containing (depending on the trial) twice the lethal dose of 189 mg sodium nitrite per kg of the pig's body weight, using baits prepared by the method described in Example 1. Multiple pigs were used in some individual trials, to increase competition between animals, in an attempt to increase bait consumption per animal. Most pigs died if they consumed at least half the bait offered. Pigs survived when they consumed no bait, or less than half the bait offered.

The first set of trials used pigs individually housed under roof in 3.5 m×3.5 m holding pens. The purpose of these experiments was to determine the acceptance and preference of feral swine for the unencapsulated sodium nitrite baits, in the absence of competition between animals. The pigs (N=7) were weighed and were offered a choice of baits containing a lethal dose of unencapsulated sodium nitrite, otherwise identical control baits lacking sodium nitrite, or whole shelled corn. We observed that the pigs consumed 63% of the sodium nitrite-containing baits, 30% of the baits lacking sodium nitrite, and 43% of the whole shelled corn. In other words, the pigs affirmatively preferred the baits with the sodium nitrite toxicant. 57% of the pigs consumed more sodium nitrite-containing bait than any other treatment. 86% of the pigs consumed more sodium nitrite-containing bait than whole-shelled corn. 29% of the pigs consumed all of the sodium nitrite-containing baits, resulting in a 100% death rate in those instances. Overall, 43% of all the pigs consumed enough sodium nitrite to result in a lethal outcome. The average time to death was about 120 minutes.

A second set of trials (N=18) assessed whether competition among pigs would affect consumption rates. For each trial, two to four feral pigs were housed under a single roof in 3.5 m×3.5 m holding pens. Pigs were weighed, and sufficient number of sodium nitrite-containing baits were offered to provide a lethal dose for all pigs in the pen. The overall death rate in these trials was 39%. 21% of the sodium nitrite-containing baits were consumed. 50% of the trials had a mortality rate 50% or higher. 13% of the trials had 100% mortality. The average time to death was about 228 minutes.

From these trials we reached several conclusions: that the sodium nitrite-containing baits can effectively deliver a lethal dose of sodium nitrite to feral hogs; that the pigs do not avoid the baits; that indeed the pigs affirmatively prefer the lethal baits, at least in some cases; and that it is preferred to deliver the baits to pigs in a manner that reduces competition among pigs for the baits (for example by dispersing the baits over a wider area), so that a higher percentage of pigs in a group will consume a lethal dose.

Example 6. Effects of Age and Sex of Pigs on Bait Consumption

As of the filing date of this patent application, we had not yet conducted experiments concerning the effects of the age and sex of pigs on bait consumption. However, based on past observations of ovine social behavior in general, we presume that social dominance order within a sounder (herd, group) will likely plays a role in who eats the baits first, and how much individual pigs will consume. Ideally, all pigs that show up should eat enough bait to consume a lethal dose. Typically, older males would be highest in social dominance. But male feral pigs usually travel alone or in bachelor groups. Within a sounder the matriarch female, the oldest female, is generally the first to eat and eats the most. A sounder typically has two older female pigs, and between 6 and 20 juveniles. In general, the heavier the pig the higher its social rank, and the more it eats. It is preferred to separate the delivery of baits, either spatially or temporally, to increase the number of pigs within a sounder consuming a lethal dose of the baits.

Example 7. Modified Formulation of Un-ENCAPSULATED, High-pH Sodium Nitrite Baits As shown in the data of Examples 4 and 5, baits made by the method of Example 1 were effective in supplying a lethal dose of sodium nitrite to hogs. However, we observed that in use these baits would sometimes fall apart after they had been removed from a 0° C. freezer and thawed. Although the baits were still effective, they were less convenient to use. Besides the inconvenience factor, a frangible bait is more likely to be incompletely consumed by the target hogs, and to leave uneaten pieces behind that might be consumed by non-target species. We are uncertain why these baits became frangible.

We modified the formulation to enhance physical integrity of the baits after thawing. The formulation of Example 1 had used potato dextrose agar. In the modified formulation we replaced the potato dextrose agar with pure agar (purchased from Sigma Aldrich). Pure agar was chosen because it is a tasteless polymer that remains a gel without degradation, depending on the particular formulation, typically up to about 40° C. Sugar (sucrose, purchased from Walmart) was also added in this formulation to further reduce any bitterness. This formulation was not autoclaved, as the sodium nitrite itself can act as a preservative against many bacteria and other microbes. Initial trials suggested that a 2.5% (w/w) agar solution produced baits with adequate stiffness and resilience—almost a rubbery texture. These 2.5% (w/w) agar baits were used in tests conducted in the summer months in south Louisiana.

More specifically: 750 g deionized water was heated to boiling. Once the water was boiling, it was transferred to a 1500 mL glass beaker set on a 270° C. hot plate. 100 g of commercially-purchased sugar (sucrose) was added, and stirred with a immersion blender at a low setting. After the sugar had dissolved, 19.3 g of powdered agar was added, and the mixture was stirred with the immersion blender at a medium setting. The opaque reaction mixture was left on the hot plate for 15 minutes, and the mixture was sheared with an overhead stirrer at 800 rpm until the mixture became clear. The mixture was removed from the heat source. After it had cooled to around 75° C., 22.5 g of dried pogie fish (*Brevoortia patronus*) and 5 g sodium carbonate were added to the mixture, with shearing from the immersion blender at a medium setting. Finally 195 g sodium nitrite were added to the mixture once the temperature had dropped to 60° C., and the mixture was mixed thoroughly for a few minutes with the immersion blender before it was poured into molds. The molds were left undisturbed for about 30 minutes. The mixture then solidified or gelled. The molds were transferred to a refrigerator to cool and gel further overnight. The solidified baits were removed from the molds and stored at 4° C. in Ziploc™ bags until they were used.

The modified baits were found to be stable both when refrigerated, and when stored at room temperature. It is preferred to store the baits at 4° C. or to keep them frozen. After being kept in a freezer for 20 days, the thawed baits remained intact after thawing and being held at room temperature for several days. The modified formulation fragmented much less than the formulation of Example 1, and is therefore more likely to be completely consumed by the pigs, and less likely to produce small pieces that might be eaten by birds or other non-target species.

The complete disclosures of all references cited in this specification are hereby incorporated by reference in their entirety, as is the complete disclosure of priority application Ser. No. 62/896,779. In the event of an otherwise irresolvable conflict, however, the disclosure of the present specification shall control.

What is claimed:

1. A method for killing a feral hog, comprising feeding the hog a composition, in an amount sufficient to supply a lethal dose of sodium nitrite to the hog; wherein the composition comprises a mixture of:
    (a) a food that is acceptable to feral hogs;
    (b) sodium nitrite, wherein the sodium nitrite is not microencapsulated; and
    (c) a base selected from the group consisting of sodium carbonate, sodium bicarbonate, calcium carbonate, magnesium hydroxide, magnesium carbonate, potassium carbonate, potassium bicarbonate, egg white albumin, and an amine; wherein the concentration of the base imparts a pH between 8 and 11 to the mixture;
    wherein the composition is supplied as a bolus or boluses, comprising at least 2.0 gram sodium nitrite per bolus;
    wherein the pH of the composition inhibits the decomposition of the sodium nitrite, such that when the composition is placed outdoors in a field or in a bait station under ambient conditions, any decomposition of the sodium nitrite is sufficiently slow that the composition does not become aversive to hogs for at least seven days; and
    wherein, for at least seven days, when placed outdoors under ambient conditions, the composition remains acceptable to feral hogs.

2. The method of claim 1, wherein one, two, three, or four individual boli of the composition supply a lethal dose of sodium nitrite to the hog.

3. The method of claim 1, wherein the mixture additionally comprises at least 300 milligram luteolin per bolus, and wherein said method comprises feeding the hog the composition in an amount sufficient to supply a lethal dose of sodium nitrite and luteolin to the hog.

4. The method of claim 1, wherein the mixture additionally comprises monosodium glutamate, monopotassium glutamate, or both.

5. The method of claim 1, wherein each bolus comprises at least 8.0 gram sodium nitrite.

6. The method of claim 1, wherein the mixture additionally comprises an antiemetic compound that reduces the likelihood the hog will vomit after feeding on the composition.

7. The method of claim 1, wherein the composition is placed outdoors in a field or in a bait station under ambient conditions; and wherein the pH of the composition inhibits the decomposition of the sodium nitrite, such that under ambient conditions, any decomposition of the sodium nitrite is sufficiently slow that the composition does not become aversive to feral hogs for at least seven days, and will readily be eaten by feral hogs for at least seven days; wherein the ambient conditions to which the composition is exposed include daytime temperatures of 90 degrees Fahrenheit or greater, and a relative humidity of fifty percent or greater.

* * * * *